United States Patent
Brame et al.

(10) Patent No.: US 8,991,938 B2
(45) Date of Patent: Mar. 31, 2015

(54) WHEEL CONSTRUCTION

(75) Inventors: Giampietro Brame, Brescia (IT);
Vincenzo Zuccarotto, Brescia (IT)

(73) Assignee: GKN Land Systems Limited, Telford (GB)

( * ) Notice: Subject to any disclaimer, the term of this patent is extended or adjusted under 35 U.S.C. 154(b) by 883 days.

(21) Appl. No.: 12/936,167

(22) PCT Filed: Mar. 25, 2009

(86) PCT No.: PCT/GB2009/000775
§ 371 (c)(1),
(2), (4) Date: Dec. 20, 2010

(87) PCT Pub. No.: WO2009/122135
PCT Pub. Date: Oct. 8, 2009

(65) Prior Publication Data
US 2011/0101770 A1    May 5, 2011

(30) Foreign Application Priority Data

Apr. 4, 2008   (EP) .................................. 08103392

(51) Int. Cl.
*B60B 21/10*   (2006.01)
*B60B 21/02*   (2006.01)
(Continued)

(52) U.S. Cl.
CPC ............... *B60B 21/104* (2013.01); *B60B 3/044* (2013.01); *B60B 21/026* (2013.01); *B60B 21/028* (2013.01); *B60B 21/04* (2013.01); *B60B 21/102* (2013.01)
USPC .................................................. 301/95.101

(58) Field of Classification Search
CPC .... B60B 21/02; B60B 21/021; B60B 21/023; B60B 21/026; B60B 21/028; B60B 21/10; B60B 21/102; B60B 21/104; B60B 21/106; B60B 21/108

USPC ........ 301/95.101, 63.101, 63.103; 152/379.3, 152/379.4, 379.5, 381.3, 381.5
See application file for complete search history.

(56) References Cited

U.S. PATENT DOCUMENTS 4,246,950 A * 1/1981 Welter ........................ 152/381.4
4,502,521 A * 3/1985 Tavazza et al. ............ 152/381.4
(Continued)

FOREIGN PATENT DOCUMENTS

EP       0 170 085 A1    2/1986
EP       0 334 955 A1   10/1989
(Continued)

OTHER PUBLICATIONS

International Search Report for PCT/GB2009/000775, mailed Jun. 23, 2009.

*Primary Examiner* — Kip T Kotter
(74) *Attorney, Agent, or Firm* — Marshall, Gerstein & Borun LLP

(57) ABSTRACT

A wheel construction includes a wheel rim having axially inner and outer portions and a mid-portion, and each axially inner and outer portion, a connecting surface adjoining a flange and extending towards the mid portion. The construction includes a side part between the connecting surface and the mid portion, and for at least one of the inner and outer portions, the connecting surface is a frusto-conical having an axial end of greatest radius and an axial end of least radius, the connecting surface the greatest radius, adjoining the flange and the axial end of least radius adjoining a circumferentially extending convex surface which extends beyond the end of least radius, and a selected side part including a generally frusto-conical region and a curved region including circumferentially extending concave surfaces and the curved region adjoining the end of least radius.

20 Claims, 2 Drawing Sheets

(51) Int. Cl.
  *B60B 3/04* (2006.01)
  *B60B 21/04* (2006.01)

(56) References Cited

U.S. PATENT DOCUMENTS

| | | | | |
|---|---|---|---|---|
| 4,606,390 | A | * | 8/1986 | Shute .................... 152/381.4 |
| 4,878,527 | A | * | 11/1989 | Noma .................... 152/379.3 |
| 5,070,921 | A | * | 12/1991 | Wada et al. ............... 152/516 |
| 5,318,088 | A | * | 6/1994 | Billieres .................. 152/379.3 |
| 6,450,226 | B2 | * | 9/2002 | DeLacroix et al. ........... 152/427 |
| 6,474,385 | B1 | * | 11/2002 | Bonning et al. ............ 152/381.4 |
| 7,014,274 | B2 | * | 3/2006 | Guimard et al. ......... 301/95.101 |
| 2009/0223614 | A1 | * | 9/2009 | Jensen ..................... 152/379.5 |

FOREIGN PATENT DOCUMENTS

| | | |
|---|---|---|
| EP | 0 410 672 A1 | 1/1991 |
| EP | 1 186 442 A2 | 3/2002 |
| EP | 1 543 997 A1 | 6/2005 |
| GB | 2 431 141 A | 4/2007 |

\* cited by examiner

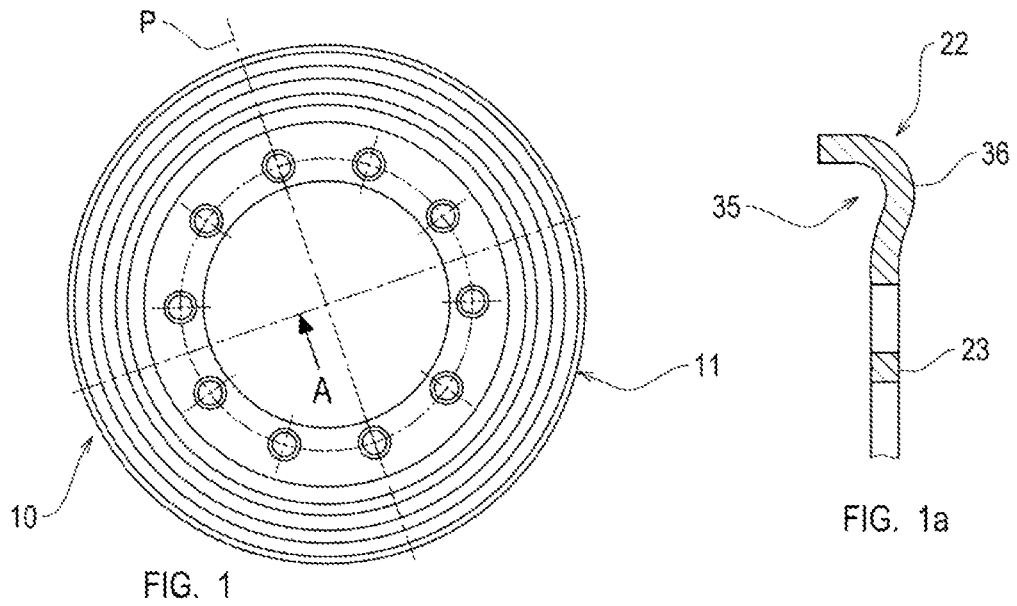
FIG. 1
FIG. 1a
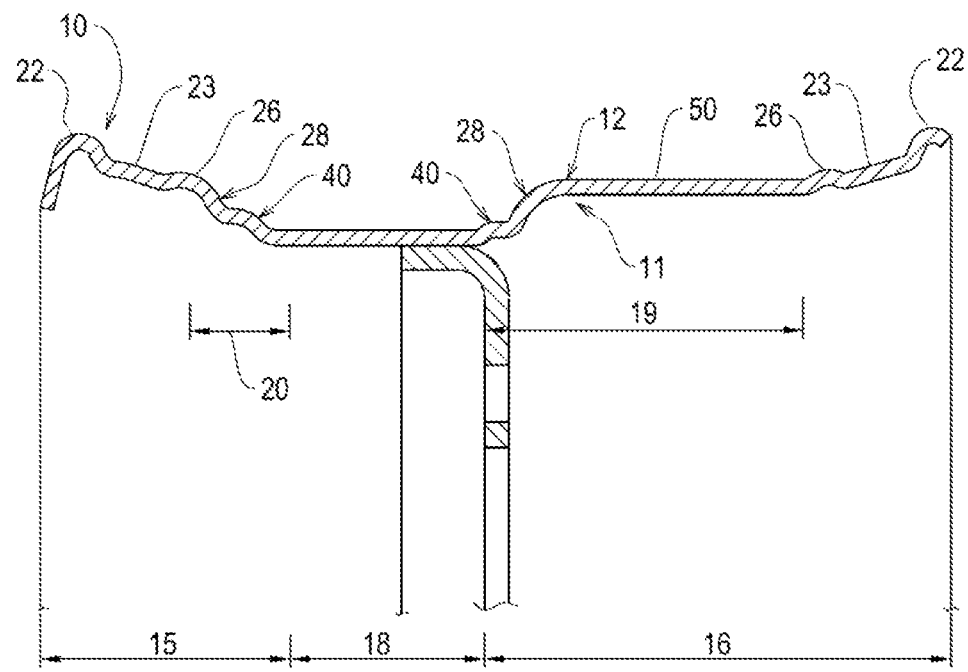
FIG. 2

WHEEL CONSTRUCTION

FIELD OF DISCLOSURE

This invention relates to a wheel construction and more particularly but not exclusively to a wheel construction for agricultural vehicles or light construction machines or the like.

BACKGROUND

Wheel constructions for agricultural vehicles and the like off-road vehicles, are known which include a circular wheel rim which provides respective axially inner and outer flanges which each provide a seat for a tyre bead of a floatation tyre which is fitted to a radially outer, or "tyre side" of the rim. In the example of U.S. Pat. No. 5,560,686, such a wheel construction is disclosed which further includes a disc by means of which the wheel is securable to a hub of the vehicle, the disc being connected to a radially inner side of the rim and the disc and rim being separable. The invention is also applicable to wheels in which the rim and disc are permanently connected together e.g. by welding.

In this specification, by "floatation tyre" we mean a wide (axially long) tyre which spreads loads thus reducing, e.g. soil, compaction, when the tractor is driven on a non-road surface.

Agricultural vehicle wheel constructions 110 are known, such as the one illustrated in FIG. 3, which include a wheel rim 111 with axially inner and outer portions 115 which each provide a tyre bead seat flange 122, and an adjoining frusto-conical connecting surface 123 which extends axially towards the mid-portion 118 where there is a central well. The tyre bead seat flange 122, and typically at least a part of the connecting surface 123, together provide a seat for the tyre 114. The connecting surface 123 adjoins a circumferentially extending convex surface 126, and a frusto-conical side part 120, 128 adjoins the convex surface 126, and the mid-portion 118 of the rim 111.

It has been found that with such existing rims, the service life of the rims may be insufficient because structural stresses which occur in the area where the side parts adjoin the mid-region, can lead to premature failures of the rims.

SUMMARY

According to one aspect of the present invention we provide a wheel construction which includes a wheel rim which in use, at a tyre side of the rim, receives a tyre, the rim being circular and having axially inner and outer portions, and a mid-portion between the axially inner and outer portions, the mid-portion including a circumferential well where the radius of the wheel rim is a minimum, and each axially inner and outer portion providing a flange, a connecting surface adjoining the flange and extending axially towards the mid-portion, the flange and part of the connecting surface providing a seat for a bead of the tyre, and there being a side part between the connecting surface and the mid-portion, and wherein for at least one of the inner and outer portions, the connecting surface is a frusto-conical having an axial end of greatest radius and an axial end of least radius, the connecting surface, at its axial end of greatest radius, adjoining the flange, and the axial end of least radius adjoining a circumferentially extending convex surface, when viewed from the tyre side of the rim, the convex surface at the tyre side of the rim extending radially outwardly of the wheel axis beyond the end of least radius of the adjoining frusto-conical connecting surface, and the side part of the at least one of the axially inner and outer portions including a generally frusto-conical region and a curved region, the frusto-conical region at its end of greatest radius adjoining the convex surface, and the curved region including first and second axially spaced circumferentially extending concave surfaces, when viewed from the tyre side of the rim, the curved region adjoining the end of least radius of the frusto-conical region and the mid-portion.

The present invention enables the structural stresses which occur in the area where the side part of the at least one of the inner and outer portions adjoins the mid-region to be decreased, and this has been found to lead to structural failures in this area to be at least reduced. This enables the service life of the rim to be increased compared with prior proposals, and moreover, the thickness of the rim material can be reduced without compromising the structural integrity of the rim, thus reducing weight and the cost of production. Preferably the first concave surface of the curved region is located radially outwardly of the second concave surface, and preferably the second concave surface continuously adjoins the mid-region and the first concave surface continuously adjoins the frusto-conical region, but the curved region may include a frusto-conical formation between the second concave surface and the mid region and/or the first concave surface and the frusto-conical region, if required.

Between the first and second concave surfaces there may be a convex formation, when viewed from the tyre side of the rim. Preferably this convex formation continuously melds with the adjacent first and second concave surfaces to provide a continuously undulating curved region, but in another example, between the first and second concave surfaces there may be one or more frusto-conical or cylindrical connecting formations.

The first and second concave surfaces, and the convex formation between the first and second curved surfaces, where provided, may each be of a local respectively internal and external, radius of between 10 mm and 25 mm, and more typically about 18 mm. By "local" radius we mean the actual radius of the surface rather than the radial distance of the surface from the wheel axis.

The convex surface of the at least one of the inner and outer portions of the rim, may be of a local external radius which varies between about 11 mm adjacent where the convex surface adjoins the end of least radius of the connecting surface, to about 23 mm where the convex surface adjoins the side part. Desirably the convex surface of the at least one inner and outer portion of the rim extends radially from the wheel axis such that the distance between a tangent of the convex surface which is parallel to the frusto-conical connecting surface at the tyre side of the rim, and the connecting surface itself, is at least 3 mm and more preferably about 4.5 mm. Preferably the convex surface of the at least one of the inner and outer portions of the rim, continuously melds with the end of least radius of the frusto-conical connecting surface, with a local internal local radius where they meld, of between 3 mm and 8 mm, and more typically 5 mm.

The frusto-conical region of the side part may subtend and angle between 15° and 50°, and more preferably about 40°, to a radial plane which is perpendicular to the wheel axis. Thus the cone angle of the frusto-conical region may be about 100°.

The frusto-conical connecting surface of the at least one of the inner and outer regions may subtend an angle to a plane which is perpendicular to the wheel axis, of between 72° and 78° and typically about 75°. Thus the cone angle of the frusto-conical connecting surface may be about 30°.

In another example though the frusto-conical connecting surface of the at least one of the inner and outer regions may subtend an angle to a plane which is perpendicular to the wheel axis, of between 94° and 96° and typically about 95°. Thus the cone angle of the frusto-conical connecting surface may be about 10°.

Conventionally the flanges of the inner and outer portions are provided by circumferentially extending curved formations at the axial ends of the rim, each curved formation including a convex surface, when viewed from the tyre side of the rim which extends radially outwardly of the wheel axis to where the radius of the wheel rim is a maximum, and the flange terminating at the axial end of the rim at a position radially outwardly of the convex surface adjoining the end of minimum radius of the frusto-conical connecting surface and the side part. Desirably though in the construction of the present invention the flange of the at least one of the inner and outer portions terminates at a position radially inwardly of the convex surface adjoining the end of minimum radius of the frusto-conical connecting surface and the side part, to add additional stiffness at the axial end of the rim.

If desired the wheel rim may be symmetrical about a central plane of the mid-portion which is perpendicular to the wheel axis, in which case both of the inner and outer portions of the rim may have the features of the invention identified above, but in another example the rim may be asymmetrical with the axially outer portion i.e. the portion of the rim which is axially outermost of the vehicle on which the wheel is in use mounted, may have the features of the invention identified above.

In this latter case, the inner portion of the rim may include a frusto-conical connecting surface adjoining the flange, and a convex surface when viewed from the tyre side of the rim, and a side part including a frusto-conical region and a curved region which includes first and second concave surfaces, when viewed from the tyre side of the rim, between the convex surface and the mid-portion. The side part of the inner portion of the rim may additionally include a generally cylindrical region between the frusto-conical region and the convex surface.

BRIEF DESCRIPTION OF THE DRAWINGS

Embodiments of the invention will now be described with reference to the accompanying drawings in which:

FIG. 1 is an illustrative axial end view of a wheel for an agricultural or light construction vehicle, in accordance with the present invention;

FIG. 1A shows a modified flange detail;

FIG. 2 is a partial cross sectional view on I-I of FIG. 1, showing the general wheel construction;

DETAILED DESCRIPTION

Figure 3:
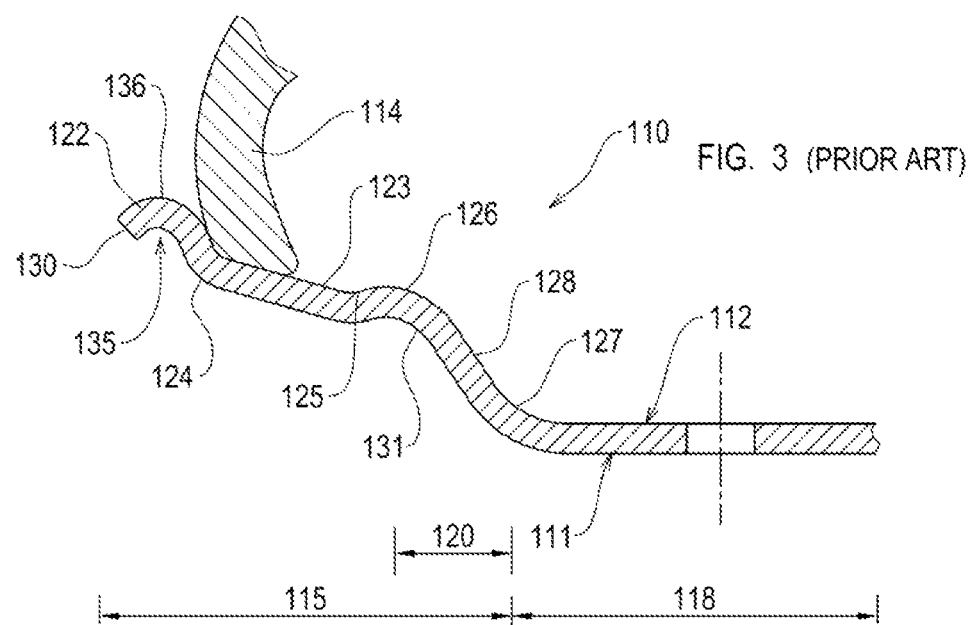
FIG. 3 cross detailed sectional view of an axially outer portion of a prior art wheel construction.

Referring to FIGS. 1 and 2 there is shown a wheel construction 10 which includes a wheel rim 11 which in use, at a tyre side 12 of the rim 11 receives a tyre 114. The position of the tyre 14 is indicated only in FIG. 3.

The rim 11 is circular and in this case is asymmetrical, having axially inner 16 and axially outer 15 portions, and a mid-portion 18 between the axially inner and outer portions 15, 16.

Each axially inner and outer portion 16, 15 provides a flange 22, a frusto-conical connecting surface 23, and side parts 19, 20 between the mid-portion 18 and each respective flange.

Each flange 22 and an adjacent part of the connecting surface 23 in use, provide a seat for a bead of the tyre 14.

The configuration of the axially outermost portion 15 of the rim 11 i.e. the portion of the rim 11 which is use is axially outermost of the vehicle on which the wheel 10 is mounted, will now be described in detail, with additional reference to FIG. 4.

The generally frusto-conical connecting surface 23 has an axial end 24 of greatest radius and an axial end 25 of least radius, the connecting surface 23, at its axial end 24 of greatest radius, adjoins the flange 22, and the connecting surface 23 extending inwardly of the rim 11 towards the mid-portion 18. The axial end 25 of the frusto-conical connecting surface 23 of least radius adjoins a circumferentially extending convex surface 26, i.e. a surface which is convex when viewed from the tyre side 12 of the rim 11.

The convex surface 26 at the tyre side 12 of the rim 11 extends radially outwardly of the wheel axis A beyond the end 25 of least radius of the adjoining frusto-conical connecting surface 23.

The mid-portion 18 includes a circumferential well where the radius of the wheel rim 11 is a minimum.

Referring now to FIG. 3, parts corresponding to the wheel construction 10 already described, and parts to be described, are all indicated by the same references with the addition of a "1" prefix.

The side part 120 in the FIG. 3 prior art wheels, includes a frusto-conical region 128 which at its end 131 of greatest radius, adjoins the convex surface 126 of the outer portion 115 and the frusto-conical region 128 also adjoins, at its end 127 of least radius, the mid-portion 118 of the wheel rim 111.

It has been found that with such a proposal, as the wheel rim 111 is formed, typically by a cold forming or pressing operation, the area where the end 127 of least radius of the frusto-conical region 128 adjoins the mid-portion 118 is formed with structural stresses which can lead to premature failure of the wheel rim 111 in this area.

Also, the flanges 122 at the axial ends of the wheel construction 110 which provide the tyre 114 bead seats have been found to be insufficiently substantial. In this prior art proposal (and as indicated in FIG. 1) the flanges 122 of the inner and outer portions 115, 116 are provided by circumferentially extending curved formations 135 at the axial ends of the rim 111, each curved formation 135 including a convex surface 136, when viewed from the tyre side 112 of the rim 111 which extends radially outwardly of the wheel axis A to where the radius of the wheel rim 111 is a maximum. The flanges 122 terminate at the axial ends of the rim at positions 130 radially outwardly of the convex surface 126 adjoining the end 125 of minimum radius of the frusto-conical connecting surface 123, and the respective side parts 119, 120.

Figure 4:
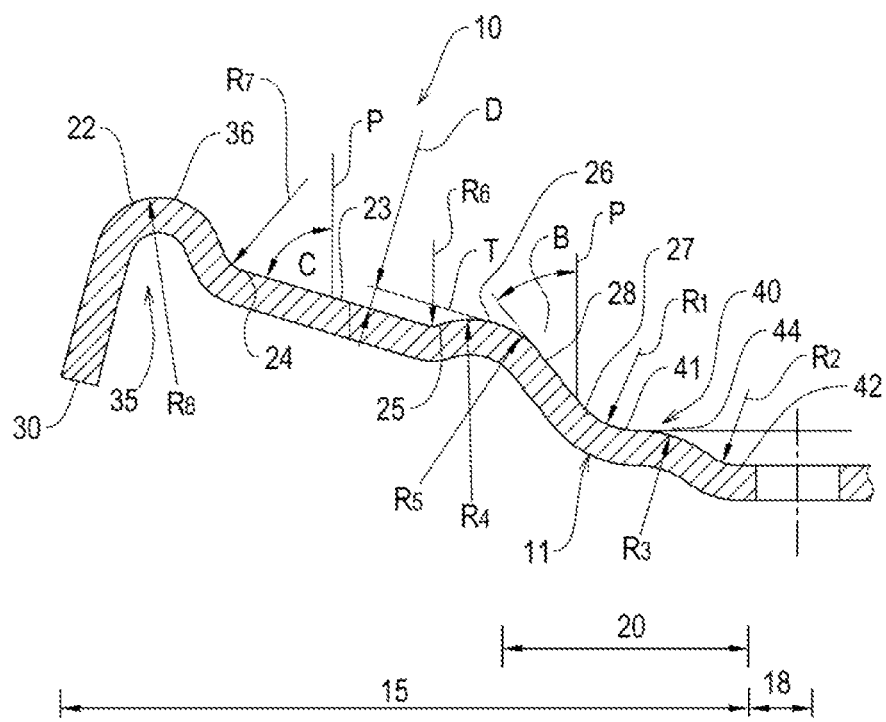
FIG. 4 is a view similar to FIG. 3 but of part of a wheel construction in accordance with the present invention, and slightly enlarged for clarity.

Referring now to FIG. 4 the contrast of the arrangement of the present invention compared with the prior art rim 111 of FIG. 3 can readily be seen.

The side part 20 is of a modified configuration compared to the side part 20 of the FIG. 3 prior proposal. Particularly the side part 20 includes both a frusto-conical region 28 and a curved region 40. By providing the side part 20 with particularly the curved region 40, the stresses present in the FIG. 3 proposal in the area where the end 27 of least radius of the frusto-conical region 28 adjoins the mid-portion 18 are avoided during manufacture thus improving the service life of the wheel 10.

The frusto-conical region 28 subtends an angle B of about 40° to a plane P which extends perpendicularly to the wheel axis A but the frusto-conical region 28 may in other examples, typically subtend an angle of between 15° and 50°.

The curved region 40 is provided by a first circumferentially extending concave surface 41 and a second circumferentially extending concave surface 42 (both when viewed from the tyre side 12 of the rim 11), the first and second concave surfaces 41, 42 being axially separated in this example, by a convex formation 44 (when viewed from the tyre side 12 of the rim 11).

In this example, the first concave surface 41 of the curved region 40 is located radially outwardly (relative to the wheel axis A) of the second concave surface, 42, and the second concave surface 42 continuously adjoins the mid-region 18.

The convex formation 44 between the first and second concave surfaces 41, 42 continuously melds with the adjacent concave surfaces 41, 42 so that the curved region 40 is continuously undulating, but if desired, there may be a frusto conical or cylindrical region between the convex formation 44 and one or other of the concave surfaces 41, 42.

In the example of FIG. 4, the first and second concave surfaces 41, 42, and the convex formation 44 between them, each are of a local respectively internal and external, radius R1, R2, R3 respectively, of about 18 mm, but in any event preferably between 10 mm and 25 mm. The radii R1, R2, R3 need not all be the same, as in the example, but at least one of the concave surfaces 41, 42 may have a local radius different to at least one of the other of the other concave surface 42, 41 and the convex formation 44 as desired.

The convex surface 26 of the outer portion 15 of the rim 11 in the example, may have a varying local radius of between 11 mm as shown at R4, and 23 mm at R5, where R4 is axially outwardly beyond radius R5.

It can also be seen that the convex surface 26 of the outer portion 15 of the rim 11 extends radially from the wheel axis A such that the distance D between a tangent T to the convex surface 26 which is parallel to the frusto-conical connecting surface 23 at the tyre side 12 of the rim 11, and the connecting surface 23 itself, is in the example about 4.5 mm but is preferably always at least 3 mm.

It can be seen in the example that the convex surface 26 of the outer portion 15 of the rim 11 also continuously melds with the end 25 of least radius of the frusto-conical connecting surface 23, with a local internal local radius where they meld R6, of typically about 5 mm, but desirably in the range 3 mm to 8 mm.

The frusto-conical connecting surface 23 of the outer region 15 may subtend an angle C to the plane P which is perpendicular to the wheel axis A, of 75° as in the example shown, but preferably between 72° and 78° so that the cone angle of the frusto-conical connecting surface 23 may be about 30°.

In another example, if desired, the frusto-conical connecting surface 23 of the outer region 15 may subtend an angle C to the plane P which is perpendicular to the wheel axis A, of 95° as in the example shown, or at least is between 94° and 96° so that the cone angle of the frusto-conical connecting surface 23 may be about 10°.

In the wheel construction 10 in the example of FIG. 4 (and FIG. 1A) the flanges 22 of the inner and outer portions 15, 16 each terminate at a respective position 30 inwardly radially relative to the wheel axis A of the convex surface 26 adjoining the end 25 of minimum radius of the frusto-conical connecting surface 23 and the respective side part 19, 20. Thus the flanges 22 are more substantial than in the prior art proposal and add additional stiffness at the axial ends of the rim 11, as well as adding stiffness to the rim 11 generally. In the example, the convex surface 36 of each flange 22, when viewed from the tyre side 12 of the rim 11, has a radius R8 of about 12.7 mm, and the flange 22 adjoining the end 24 of maximum radius of the frusto-conical connecting surface 23, with a radius R7 in the order of 8 mm.

In the example depicted in FIG. 4, the radius of the side part 20 of the rim 11 from the convex surface 26 to the mid-portion 18 does not increase. In the example illustrated in FIG. 4, the radius of the side part 20 of the rim 11, from the convex surface 26 to the mid-portion 18, decreases continuously.

By adopting the present invention, a rim 11 is provided in which the material thickness of the rim 11 can be reduced compared with comparable rims which do not incorporate the invention.

Various modifications are possible without departing from the scope of the invention.

In the example shown in FIGS. 1, 2 and 4, the rim 11 is asymmetrical about a central plane P of the mid region 18 which is perpendicular to the wheel axis A. In the example, the side part 19 of the axially inner region 16 of the rim 11 includes a generally cylindrical region 50 between the frusto-conical region 28 and the convex surface 26 so that the wheel rim 11 extends axially further from the mid region 18 towards the vehicle on which the wheel 10 is in use mounted, than the rim 11 extends axially outwardly. Otherwise in the example of FIG. 2, both inner and outer portions 15, 16 of the rim 11 include side parts 19, 20 with substantially similar but mirrored, frusto conical 28 and curved regions 40 as described.

In another example, at least one of the side parts 19, 20 may include, between the second concave surface 42 and the mid region 18 and/or the first concave surface 41 and the frusto-conical region 28, a frusto-conical formation, if desired.

Further, although in the example described with reference to the drawings, the convex formations 44 of each of the side parts 19, 20 continuously meld with the adjacent first and second concave surfaces 41, 42 to provide a continuously undulating curved region 40, in another example, between the first and second concave surfaces 41, 42 of at least one of the side parts 19, 20, these may include one or more frusto-conical or cylindrical connecting formations.

In another example, the wheel rim 11 may be symmetrical about the central plane P which is perpendicular to the wheel axis A.

Although the wheel construction described is that of a floatation wheel for use on an agricultural vehicle such as a tractor, or a light construction vehicle such as an excavating and/or loading machine, the invention may be applied to another wheel construction.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A wheel construction which includes a wheel rim which in use, at a tire side of the rim, receives a tire, the rim being circular and having axially inner and outer portions, and a mid-portion between the axially inner and outer portions, the mid-portion including a circumferential well where the radius of the wheel rim is a minimum, and each axially inner and outer portion providing a flange, a connecting surface adjoining the flange and extending axially towards the mid-portion, the flange and a part of the connecting surface providing a seat for a bead of the tire, and there being a side part between the connecting surface and the mid-portion, and wherein for at least one of the inner and outer portions, the connecting surface is a frusto-conical having an axial end of greatest radius and an axial end of least radius, the connecting surface, at its axial end of greatest radius, adjoining the flange, and the axial end of least radius adjoining a circumferentially extending convex surface, when viewed from the tire side of the rim, the convex surface at the tire side of the rim extending radially outwardly of the wheel axis beyond the end of least radius of the adjoining frusto-conical connecting surface, and the side part of the at least one of the axially inner and outer portions including a frusto-conical region and a curved region, the frusto-conical region at its end of greatest radius adjoining the convex surface, and the curved region including first and second axially spaced circumferentially extending concave surfaces, when viewed from the tire side of the rim, the first concave surface of the curved region continuously adjoining the end of least radius of the frusto-conical region, and the second concave surface continuously adjoining the mid-portion, and between the first and second concave surfaces there being a convex formation, when viewed from the tire side of the rim, the convex formation continuously melding with the adjacent first and second concave surfaces such that the curved region is continuously undulating.

2. A construction according to claim 1 wherein the first and second concave surfaces and the convex formation between the first and second concave surfaces are each of a local respectively internal and external, radius of between 10 mm and 25 mm.

3. A construction according to claim 1 wherein the first and second concave surfaces, and the convex formation between the first and second curved surfaces are each of a local respectively internal and external, radius of 18 mm.

4. A construction according to claim 1 wherein the convex surface of the at least one of the inner and outer portions of the rim, is of a local external radius which varies between 11 mm adjacent where the convex surface adjoins the end of least radius of the connecting surface, to 23 mm where the convex surface adjoins the side part.

5. A construction according to claim 1 wherein the convex surface of the at least one inner and outer portion of the rim extends radially from the wheel axis such that the distance between a tangent of the convex surface which is parallel to the frusto-conical connecting surface at the tire side of the rim, and the connecting surface itself, is at least 3 mm.

6. A construction according to claim 5 wherein the convex surface of the at least one inner and outer portion of the rim extends radially from the wheel axis such that the distance between a tangent of the convex surface which is parallel to the frusto-conical connecting surface at the tire side of the rim, and the connecting surface itself, is about 4.5 mm.

7. A construction according to claim 1 wherein the frusto-conical region of the side part subtends an angle of between 15° and 50° to a radial plane which is perpendicular to the wheel axis.

8. A construction according to claim 7 wherein the frusto-conical region of the side part subtends an angle of about 40° to a radial plane which is perpendicular to the wheel axis.

9. A construction according to claim 1 the wheel rim is asymmetrical with the axially outer portion being the portion of the rim which is axially outermost of the vehicle on which the wheel is in use mounted, being the at least one rim.

10. A construction according to claim 9 wherein the inner portion of the rim includes a frusto-conical connecting surface adjoining the flange, and a convex surface when viewed from the tire side of the rim, and a side part including a frusto-conical region and a curved region which includes first and second concave surfaces, when viewed from the tire side of the rim, between the convex surface and the mid-portion.

11. A construction according to claim 10 wherein the side part of the inner portion of the rim additionally includes a generally cylindrical region between the frusto-conical region and the convex surface.

12. A construction according claim 1 wherein the convex surface of the at least one of the inner and outer portions of the rim, continuously melds with the end of least radius of the frusto-conical connecting surface, with a local internal local radius where they meld, of between 3 mm and 8 mm.

13. A construction according to claim 12 wherein the convex surface of the at least one of the inner and outer portions of the rim, continuously melds with the end of least radius of the frusto-conical connecting surface, with a local internal local radius where they meld, of about 5 mm.

14. A construction according to claim 1 wherein the frusto-conical connecting surface of the at least one of the inner and outer portions subtends an angle to a plane which is perpendicular to the wheel axis, of between 72° and 78°.

15. A construction according to claim 14 wherein the frusto-conical connecting surface of the at least one of the inner and outer portions subtends an angle to a plane which is perpendicular to the wheel axis, of about 75°.

16. A construction according to claim 1 wherein the frusto-conical connecting surface of the at least one of the inner and outer regions subtends an angle to a plane which is perpendicular to the wheel axis, of between 94° and 96°.

17. A construction according to claim 16 wherein the frusto-conical connecting surface of the at least one of the inner and outer portions subtends an angle to a plane which is perpendicular to the wheel axis, of about 95°.

18. A construction according claim 1 wherein the flange of the at least one of the inner and outer portions terminates at a position radially inwardly of the convex surface adjoining the end of minimum radius of the frusto-conical connecting surface and the side part.

19. The wheel construction of claim 1, wherein a radius of the generally frusto-conical region continuously increases at a constant angle from the end of least radius to the end of greatest radius.

20. A wheel construction which includes a wheel rim which in use, at a tire side of the rim, receives a tire, the rim being circular and having axially inner and outer portions, and a mid-portion between the axially inner and outer portions, the mid-portion including a circumferential well where the radius of the wheel rim is a minimum, and each axially inner and outer portion providing a flange, a connecting surface adjoining the flange and extending axially towards the mid-portion, the flange and a part of the connecting surface providing a seat for a bead of the tire, and there being a side part between the connecting surface and the mid-portion, and wherein for at least one of the inner and outer portions, the connecting surface is a frusto-conical having an axial end of greatest radius and an axial end of least radius, the connecting surface, at its axial end of greatest radius, adjoining the flange, and the axial end of least radius adjoining a circumferentially extending convex surface, when viewed from the tire side of the rim, the convex surface at the tire side of the rim extending radially outwardly of the wheel axis beyond the end of least radius of the adjoining frusto-conical connecting surface, and the side part of the at least one of the axially inner and outer portions including a frusto-conical region and a curved region, the frusto-conical region at its end of greatest radius adjoining the convex surface, the frusto-conical region subtending a constant angle of between 15° and 50° to a plane which is perpendicular to the wheel axis, and the curved region including first and second axially spaced circumferentially extending concave surfaces, when viewed from the tire side of the rim, the first concave surface of the curved region continuously adjoining the end of least radius of the frusto-conical region, and the second concave surface continuously adjoining the mid-portion, and between the first and second concave surfaces there is a convex formation, when viewed from the tire side of the rim, the radius of the side part of the rim, from the convex surface to the mid-portion, decreasing continuously.

* * * * *